United States Patent
Wong et al.

(10) Patent No.: US 8,049,387 B2
(45) Date of Patent: Nov. 1, 2011

(54) ELECTRIC MOTOR

(75) Inventors: Ben To Fan Wong, Hong Kong (CN);
Biao Yu, Shenzhen (CN); Tian Jun Liao, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 126 days.

(21) Appl. No.: 12/604,946

(22) Filed: Oct. 23, 2009

(65) Prior Publication Data

US 2010/0102662 A1    Apr. 29, 2010

(30) Foreign Application Priority Data

Oct. 24, 2008    (CN) .......................... 2008 1 0217074

(51) Int. Cl.
*H02K 23/04*    (2006.01)
(52) U.S. Cl. ......... 310/154.22; 310/154.21; 310/154.08; 310/154.01; 310/154.25
(58) Field of Classification Search ............. 310/154.01–154.49, 216.001, 310/40 MM
See application file for complete search history.

(56) References Cited

U.S. PATENT DOCUMENTS

| | | | | |
|---|---|---|---|---|
| 4,896,065 | A * | 1/1990 | Tsuyama | ................. 310/154.28 |
| 7,427,817 | B2 | 9/2008 | Uenishi et al. | |
| 7,498,706 | B2 | 3/2009 | Kuroda | |
| 7,528,515 | B2 | 5/2009 | Kuroda | |
| 2007/0200444 | A1 * | 8/2007 | Uenishi et al. | ........... 310/154.21 |

FOREIGN PATENT DOCUMENTS

| | | |
|---|---|---|
| EP | 2157677 A1 | 2/2010 |
| EP | 2157678 A1 | 2/2010 |
| JP | 09224337 A * | 8/1997 |

* cited by examiner

*Primary Examiner* — Quyen Leung
*Assistant Examiner* — Leda Pham
(74) *Attorney, Agent, or Firm* — Muncy, Geissler, Olds & Lowe, PLLC

(57) ABSTRACT

An electric motor has a rotor (20), a housing (10) and a ring magnet (12) fixed onto an inner surface of the housing. The housing (10) has a cross section in a polygon, preferably tetragonal, shape that comprises a plurality of side portions (10a~10d) and a plurality of curved corner portions (11a~11d), each of which connects two adjacent side portions. The thickness of the ring magnet at portions corresponding to the corner portions of the housing is larger than the thickness of the ring magnet at portions corresponding to the side portions of the housing. An air gap (123) is formed between a peripheral surface of the rotor and an inner surface of the ring magnet, the thickness of the air gap at portions corresponding to the corner portions of the housing being smaller than that of the air gap at portions corresponding to the side portions of the housing. The motor has a polygon housing which is convenient to install and has good space utilization.

9 Claims, 2 Drawing Sheets

ELECTRIC MOTOR

CROSS REFERENCE TO RELATED APPLICATIONS

This non-provisional patent application claims priority under 35 U.S.C. §119(a) from Patent Application No. 200810217074.5 filed in The People's Republic of China on Oct. 24, 2008.

FIELD OF THE INVENTION

This invention relates to an electric motor and in particular, to an electric motor having a permanent magnet stator.

BACKGROUND OF THE INVENTION

FIG. 1 is a cross sectional view of a conventional permanent magnet DC motor. The motor comprise a stator and a rotor 3 rotatably mounted confronting the stator. The stator comprises a cylindrical housing 1, permanent magnets 2 fixed at inner surface of the cylindrical housing. The motor will probably roll in transportation due to its cylindrical housing, and is inconvenient to install.

A square motor is showed schematically in FIG. 2. The motor also comprises a stator and a rotor 3'. The stator uses a square motor housing 1', which comprises four side portions and four corner portions. Permanent magnets 2' are fixed on an inner surface of the side portions and distributed around the rotor 3', which is rotatably mounted confronting the stator. The square motor solves the above-mentioned drawbacks. However, the square motor has a low space utilization rate, and the space near the corner portions is not used. Furthermore, the outer diameter of the rotor is restricted by the size of the square housing and the thickness of the magnets, especially in a small motor.

SUMMARY OF THE INVENTION

Hence there is a desire for a motor with a square stator having permanent magnets and a high space utilization rate.

This is achieved in the present invention by using a stator having a square housing and a ring magnet.

Accordingly, in one aspect thereof, the present invention provides an electric motor comprising a stator and a rotor rotatably mounted confronting the stator, wherein the stator comprises: a housing having a cross section in a polygon shape that comprises a plurality of side portions and a plurality of curved corner portions, each of which connects two adjacent side portions, a ring magnet fixed onto an inner surface of the housing, the thickness of the ring magnet at portions corresponding to the corner portions of the housing being greater than the thickness of the ring magnet at portions corresponding to the side portions of the housing, an air gap being formed between a peripheral surface of the rotor and an inner surface of the ring magnet, the thickness of the air gap at portions corresponding to the corner portions of the housing being smaller than that of the air gap at portions corresponding to the side portions of the housing.

Preferably, the thickness of the air gap is smallest at portions corresponding to the thickest portions of the ring magnet, and is largest at portions corresponding to the thinnest portions of the ring magnet.

Preferably, gaps are formed between the ring magnet and the corner portions of the housing.

Preferably, gaps are also formed between the side portions of the housing and the ring magnet.

Preferably, each of the corner portions has an even thickness, and curves around a center which is offset from the rotational center of the rotor.

Preferably, the radius of curvature of the inner surface of the corner portions is larger than the radius of curvature of the outer surface of the ring magnet at portions corresponding to the corner portions of the housing.

Preferably, the ratio of the radius of curvature of the inner surface of the corner portions to the radius of curvature of the inner surface of the ring magnet is between 1.1 and 1.8.

Preferably, the housing has an even thickness.

Alternatively, the thickness of the housing at the corner portions is larger than the thickness of the housing at the side portions.

Preferably, the housing has a tetragonal cross section.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
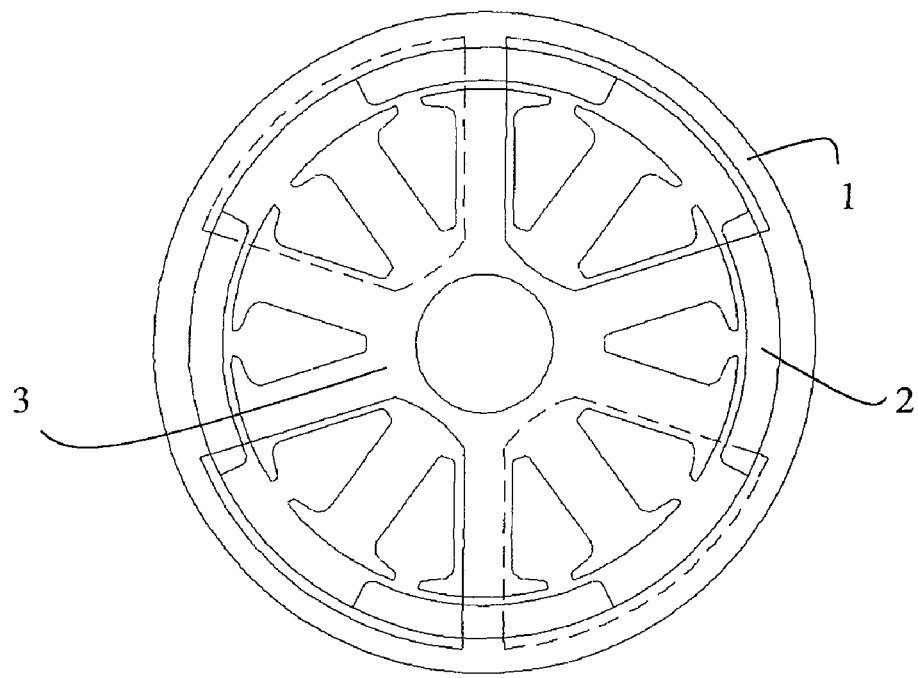
FIG. 1 is a cross sectional view of a conventional PMDC motor.
Figure 2:
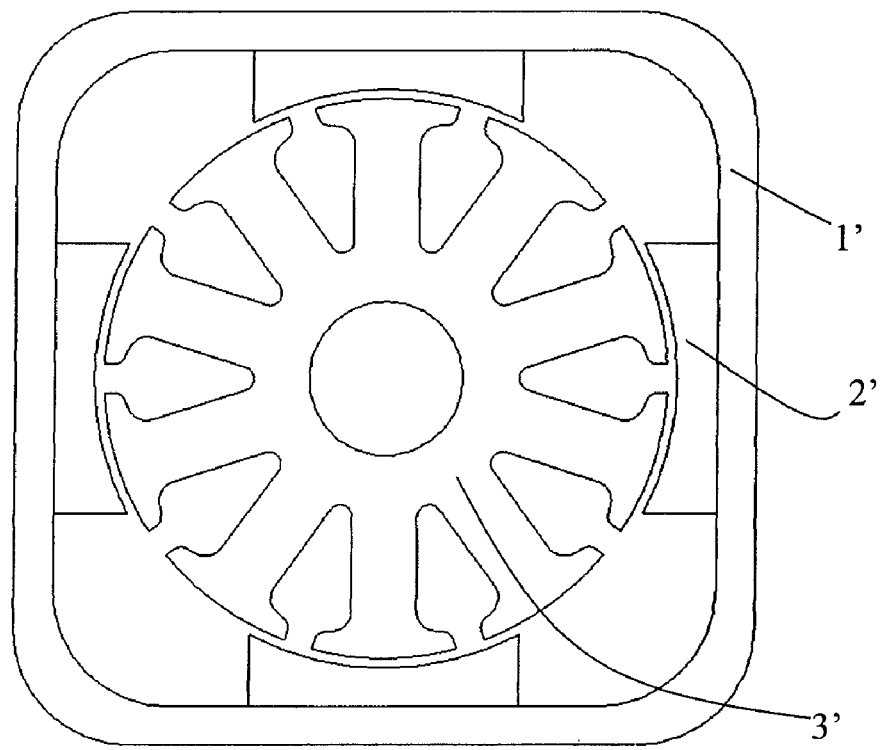
FIG. 2 is a cross sectional view of another conventional PMDC motor.
Figure 3:
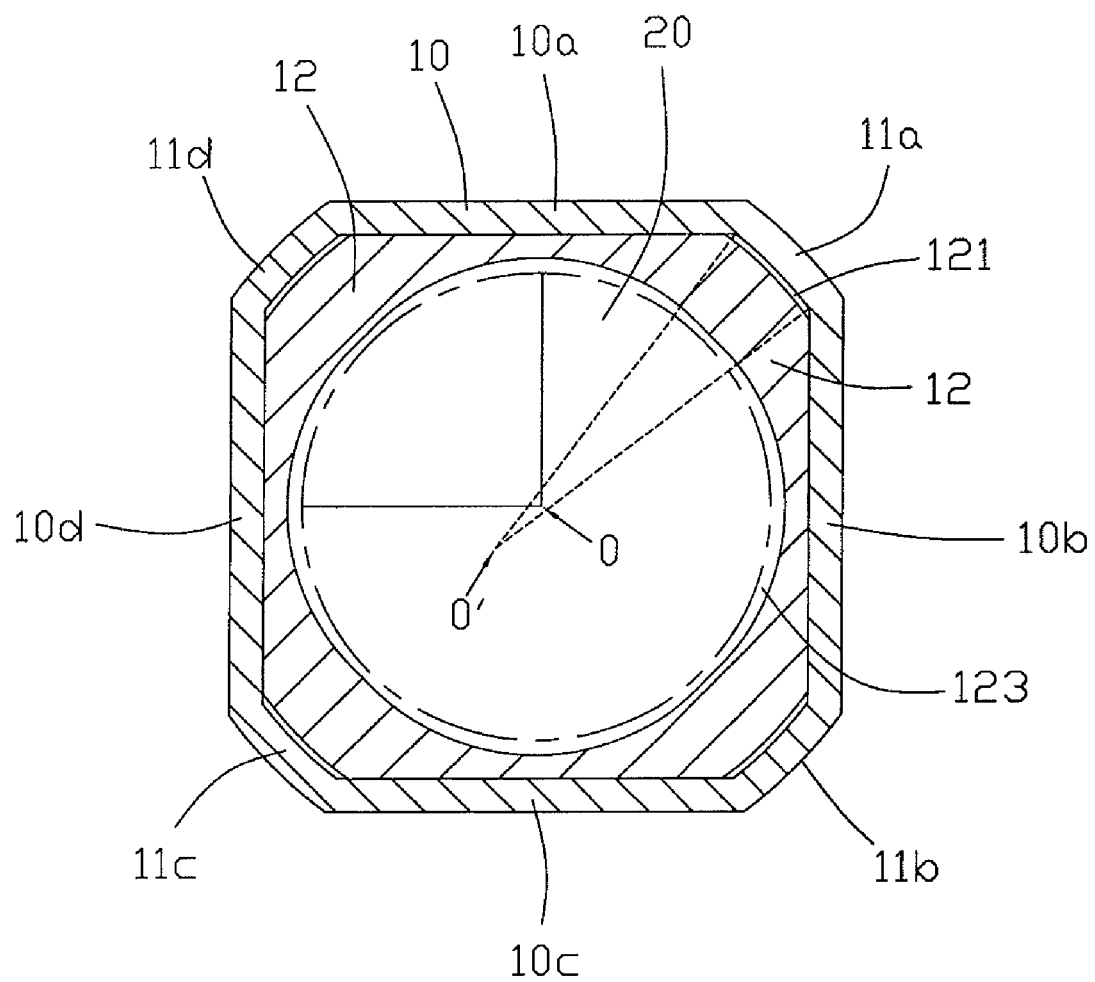
FIG. 3 is a cross sectional view of a motor according to one embodiment of the present invention.

FIG. 3 is a cross sectional view of a motor in accordance with the preferred embodiment of the present invention. The motor comprises a stator and a rotor 20 rotatably mounted confronting the stator. The stator comprises a housing 10 and a ring magnet 12 fixed to an inner surface of the housing 10. The housing 10 has a polygonal tubular shape, comprising four side portions 10a~10d and four curved corner portions 11a~11d. Each corner portion connects two adjacent side portions. For example, corner portion 11a connects adjacent side portions 10a and 10b, and corner portion 11b connects adjacent side portions 10b and 10c.

The ring magnet 12 has a larger radial thickness at portions corresponding to the corner portions of the housing 10, and has a smaller radial thickness gradually decreasing from the larger thickness portions toward circumferentially spaced portions corresponding to the middle of each side portion 10a-10d. The rotor 20 is surrounded by the ring magnet 12. There is an air gap 123 between a radially outer surface of the rotor 20 and an inner surface of the ring magnet 12. The inner surface of the ring magnet 12 not truly a right cylindrical surface as the cross section is slightly convex at portions corresponding to corner portions of the housing 10. That is, the hole in the ring magnet has a smaller diameter measured between the corner portions compared to the diameter measured between the side portions. Therefore, the radial thickness of the air gap is uneven, having a smaller radial thickness at portions corresponding to corner portions of the housing 10, and having a larger radial thickness at portions corresponding to side portions of the housing 10. Alternatively, the air gap may be of constant thickness or have a smaller radial thickness at portions corresponding to corner portions of the housing 10, and a larger radial thickness at portions corresponding to side portions of the housing 10. An uneven air gap will lower motor's magnet detent torque, and lower the risk of demagnetization.

Furthermore, there is a gap 121 between the outer surface of the ring magnet 12 and the inner surface of each corner portion of the housing 10. There can be a gap between the outer surface of the ring magnet 12 and the inner surface of each side portion of the housing 10, too. The gaps can be filled with glue to fix the ring magnet 12 to the housing 10. On the other hand, it is easier to install the ring magnet 12 inside the housing 10 due to the gaps between the ring magnet 12 and the corner portions of the housing 10.

Each of the corner portions 11a~11d is curved along an arc whose center O' is offset from the rotational center O of the rotor 20. The radius of curvature of the inner surface of each corner portion 11a~11d is greater than the radius of the outer surface of the rotor 20.

Preferably, the radius of the inner surface of each corner portion 11a~11d is greater than the radius of curvature of the outer surface of the ring magnet 12 at portions corresponding to the corner portions 11a~11d.

Optionally, the ratio of the radius of curvature of the inner surface of each corner portion 11a~11d to the radius of curvature of the inner surface of the ring magnet 12 is between 1.1 and 1.8. In one preferred embodiment, the ratio of radius of the inner surface of each corner portion 11a~11d to the radius of inner surface of the ring magnet 12 at portions corresponding to side portions 10a~10d is 11.80/6.84, or 1.73. As mentioned above, the inner surface of the ring magnet 12 is convex slightly at portions corresponding to corner portions 11a~11d of the housing 10. Therefore, in the inner surface of the ring magnet 12, the radius of portions corresponding to the side portions 10a~10d of the housing 10 is smaller than that of portions corresponding to the corner portions 11a~11d of the housing 10. Therefore, in the preferred embodiment, the ratio of the radius of curvature of the inner surface of each corner portion 11a~11d to the radius of the inner surface of the ring magnet 12 at portions corresponding to the corner portions 11a~11d is less 1.73.

In another alternative embodiment, the ring magnet 12 is symmetrical around the rotational center O of the rotor 20 and is line symmetric along one of its diagonal lines. It is easier to manufacture a symmetric ring magnet and assemble it to the housing.

In a further embodiment, the housing 10 has an even thickness, for example, 0.8 mm or 1 mm. In an alternative embodiment, the housing 10 has a larger thickness at each of the corner portions 11a~11d, and has a smaller thickness at each of side portions 10a~10d. For example, the thickness of each side portion 10a~11d is 1 mm, and the thickness of each corner portion 11a~11d is 1.1 mm.

In the above embodiments, the housing 10 comprises four side portions and four corner portions, each of which is curved. Alternatively, the housing 10 may comprise more than four side portions and corner portions.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor comprising a stator and a rotor rotatably mounted confronting the stator, wherein the stator comprises:
   a housing having a cross section in a polygon shape that comprises a plurality of side portions and a plurality of curved corner portions, each of which connects two adjacent side portions,
   a ring magnet fixed onto an inner surface of the housing, the thickness of the ring magnet at portions corresponding to the corner portions of the housing being greater than the thickness of the ring magnet at portions corresponding to the side portions of the housing,
   an air gap being formed between a peripheral surface of the rotor and an inner surface of the ring magnet, the thickness of the air gap at portions corresponding to the corner portions of the housing being smaller than that of the air gap at portions corresponding to the side portions of the housing;
   wherein gaps are formed between the ring magnet and the corner portions of the housing.

2. The electric motor of claim 1, wherein the thickness of the air gap is smallest at portions corresponding to the thickest portions of the ring magnet, and is largest at portions corresponding to the thinnest portions of the ring magnet.

3. The electric motor of claim 1, wherein gaps are formed between the side portions of the housing and the ring magnet.

4. The electric motor of claim 1, wherein each of the corner portions has an even thickness, and curves around a center which is offset from the rotational center of the rotor.

5. The electric motor of claim 1, wherein the radius of curvature of the inner surface of the corner portions is larger than the radius of curvature of the outer surface of the ring magnet at portions corresponding to the corner portions.

6. The electric motor of claim 1, wherein the ratio of the radius of curvature of the inner surface of the corner portions to the radius of curvature of the inner surface of the ring magnet is between 1.1 and 1.8.

7. The electric motor of claim 1, wherein the housing has an even thickness.

8. The electric motor of claim 1, wherein the thickness of the housing at the corner portions is larger than the thickness of the housing at the side portions.

9. The electric motor of claim 1, wherein the housing has a tetragonal cross section.

* * * * *